US006418164B1

(12) United States Patent
Endres et al.

(10) Patent No.: US 6,418,164 B1
(45) Date of Patent: Jul. 9, 2002

(54) ADAPTIVE EQUALIZER WITH ENHANCED ERROR QUANTIZATION

(75) Inventors: Thomas J Endres, Perkasie, PA (US); Samir N Hulyalkar, Plainsboro, NJ (US); Christopher H Strolle, Glenside; Troy A Schaffer, Langhorne, both of PA (US)

(73) Assignee: Nxtwave Communications, Inc., Langhorne, PA (US)

( * ) Notice: Subject to any disclaimer, the term of this patent is extended or adjusted under 35 U.S.C. 154(b) by 0 days.

(21) Appl. No.: 09/231,888

(22) Filed: Jan. 14, 1999

(51) Int. Cl.[7] ............................................. H03H 21/00
(52) U.S. Cl. .................. 375/232; 375/233; 375/235; 375/243; 375/285; 708/323; 455/204; 348/607
(58) Field of Search .................. 375/231–233, 375/235, 243, 245, 254, 261, 270, 277, 278, 285, 321, 326, 335, 350, 346, 240.02, 240.03; 708/316, 322, 323; 455/203, 204, 109; 348/470, 607, 729, 726, 735

(56) References Cited

U.S. PATENT DOCUMENTS

| | | | | |
|---|---|---|---|---|
| 4,773,083 A | * | 9/1988 | Baumbach et al. | 327/552 |
| 5,311,546 A | * | 5/1994 | Paik et al. | 375/232 |
| 5,502,506 A | * | 3/1996 | Choi | 348/607 |
| 5,517,213 A | * | 5/1996 | Bhatt et al. | 375/229 |
| 5,712,873 A | * | 1/1998 | Shiue et al. | 375/230 |
| 5,809,074 A | * | 9/1998 | Werner et al. | 375/232 |
| 5,835,532 A | * | 11/1998 | Strolle et al. | 348/725 |
| 6,011,813 A | * | 1/2000 | Ghosh | 375/233 |

* cited by examiner

Primary Examiner—Chi Pham
Assistant Examiner—Khanhcong Tran
(74) Attorney, Agent, or Firm—Allan Jacobson (57) ABSTRACT

An adaptive equalizer for use in blind equalization systems to compensate for transmission channel distortion and noise in a digital communication system uses multiple quantization levels for implementation of the Constant Modulus Algorithm (CMA). Different quantization levels are used in different regions of the CMA error function for both passband and baseband equalizers. In one embodiment, a quantizer with a step rise having logarithmic scale is used to digitize the CMA error function. In particular, a quantizer with a step rise in which each level of the quantizer step rise is a power of 2 is used to digitize the CMA error function. In another embodiment, a quantizer with a step rise in which each level of the quantizer step rise is the sum of two or more logarithmic scales is used to digitize the CMA error function. In particular, a quantizer with a step rise wherein each level of the quantizer step rise is the sum of two or more numbers each of which is a power of 2 is used to digitize the CMA error function. The use of logarithmic scales, the sum of logarithmic scales, powers of 2, or the sum of powers of 2 for the quantizer step rise size to digitize the CMA error function make efficient use of shift and add operations to achieve multiplication in the adaptation process.

43 Claims, 9 Drawing Sheets

ADAPTIVE EQUALIZER WITH ENHANCED ERROR QUANTIZATION

FIELD OF THE INVENTION

The present invention relates to equalization techniques to compensate for channel transmission distortion in digital communication systems. In particular, the present invention relates to the efficient baseband and passband implementations of the Constant Modulus Algorithm (CMA), an equalization algorithm used in blind equalization systems.

BACKGROUND OF THE INVENTION

Digital transmission of information typically involves the modulation of pulses onto an RF carrier's amplitude and/or phase. Most propagation mediums (terrestrial, cable, underwater, etc.) introduce signal distortion. Factors that cause distortions include noise, signal strength variations, phase shift variations, multiple path delays, and the like.

Noise is also known as static. Signal strength variations are commonly known as fading. In addition, multiple different paths between the transmitter and receiver through the propagation medium cause multiple path delays. The different paths have different delays that cause replicas of the same signal to arrive at different times at the receiver (like an echo). Multi-path distortion results in inter-symbol interference (ISI) in which weighted contributions of other symbols are added to the current symbol.

In addition to distortion and noise from the propagation medium, front-end portions of the receiver and transmitter also introduce distortion and noise. The presence of distortion, noise, fading and multi-path introduced by the overall communication channel (transmitter, receiver and propagation medium), can cause digital systems to degrade or fail completely when the bit error rate exceeds some threshold and overcomes the error tolerance of the system.

EQUALIZATION

Digital systems transmit data as symbols having discrete levels of amplitude and/or phase. To the extent that a symbol is received at a level that differs from one of the allowed discrete levels, a measure of communication channel error can be detected. At the receiver, it is known to use an equalizer responsive to the detected error to mitigate the signal corruption introduced by the communications channel. It is not uncommon for the equalizer portion of a receiver integrated circuit to be over half of the integrated circuit area.

An equalizer is a filter that has the inverse characteristics of the communication channel. If the transmission characteristics of the communication channel are known or measured, then the equalization filter parameters can be set directly. After adjustment of the equalization filter parameters, the received signal is passed through the equalizer, which compensates for the non-ideal communication channel by introducing compensating "distortions" into the received signal which tend to cancel the distortions introduced by the communication channel.

However, in most situations such as in broadcasting, each receiver is in a unique location with respect to the transmitter. Accordingly, the characteristics of the communication channel are not known in advance, and may even change with time. In those situations where the communication channel is not characterized in advance, or changes with time, an adaptive equalizer is used. An adaptive equalizer has variable parameters that are calculated at the receiver.

The problem to be solved in an adaptive equalizer is how to adjust the equalizer filter parameters in order to restore signal quality to a performance level that is acceptable by subsequent error correction decoding.

In some adaptive equalization systems, the parameters of the equalization filter are set using a predetermined pilot signal (a training sequence), which is periodically sent from the transmitter to the receiver. The received training sequence is compared with the known training sequence to derive the parameters of the equalization filter. After several iterations of parameter settings derived from successive training sequences, the equalization filter converges to a setting that tends to compensate for the distortion characteristics of the communications channel.

In blind equalization systems, the equalizer filter parameters are derived from the received signal itself without using a training sequence. In the prior art, it is known to adjust the equalizer parameters blindly using the Least Mean Squares (LMS) algorithm, in which the training symbols are replaced with hard decisions, or best estimates of the original input symbols. Blind equalization systems using LMS in this manner are referred to as Decision Directed LMS (DD-LMS).

However, the DD-LMS algorithm requires a good initial estimate of the input signal. For most realistic communication channel conditions, the lack of an initial signal estimate results in high decision error rates, which cause the successively calculated equalizer filter parameters to continue to fluctuate, rather than converge to a desired solution. The parameters are set to diverge in such case.

It is also known to use another algorithm, called the Constant Modulus Algorithm (CMA), in combination with the DD-LMS algorithm from a cold start. See D. N. Godard, "Self-recovering equalization and carrier tracking in two-dimensional data communication systems," IEEE Transactions on Communications, vol. 28, no 11, pp. 1867–1875, October 1980, or J. R. Treichler, B. G. Agee, An New Approach To Muli-Path Correction Of Constant Modulus Signals, IEEE Transactions On Acoustics Speech And Signal Processing, vol ASSP-31, no. 2, page 459–472 April 1983. The CMA algorithm is used first to calculate the equalizer filter parameters, which is regarded as an initial estimate. Thereafter, the equalizer filter parameters (as calculated by the CMA algorithm) are used in an acquisition mode to find the initial equalizer filter parameters to start the DD-LMS algorithm.

The CMA algorithm (as well as the DD-LMS algorithm) is usually implemented with a gradient descent strategy in which the equalizer parameters are adapted by replacing the present equalizer parameter settings with their current values plus an error (or correction) term. See C. R. Johnson, Jr., P. Schniter, T. J. Endres, J. D. Behm, D. R. Brown, R. A. Casas, "Blind equalization using the constant modulus criterion: a review," Proceedings of the IEEE, vol. 86, no. 10, pp. 1927–1950, October, 1998.

From a cold start, the receiver enters an acquisition mode. In the acquisition mode, the CMA algorithm is used first to adjust the equalizer parameters. Then, after a fixed period of time (or alternatively from a measure derived from the equalizer output), the receiver switches to the DD-LMS algorithm in a tracking mode. The acquisition mode typically requires up to 400,000 symbols. At a 10 MHz clock rate, the symbol rate is 100 nanoseconds and the time available for acquisition using the CMA algorithm is about 40 milliseconds. Overall, between the initial CMA algorithm and the following DD-LMS algorithm, the equalizer has about 100–200 milliseconds to converge.

A critical factor in an adaptive equalization system is to complete all the required multiplication operations within the time available: i.e., a single symbol interval. In particular, the error term calculation requires successive multiply operations for each equalizer parameter. One multiply per equalizer parameter is needed for one-dimensional signaling, and two multiplies per equalizer parameter is needed for two-dimensional signaling. Since a typical equalizer filter may have up to 512 filter coefficients (the number of equalizer filter parameters), the total time required to complete all the required multiplication operations with full precision often exceeds one symbol interval. That is, the large number of multiply operations often takes so long that the total time needed for calculation of all the equalizer filter coefficients exceeds the available time limit of one symbol interval. Thus, although the prior art scheme to use CMA and DD-LMS in series is theoretically possible, the large number of multiply operations prevents practical, economical commercial implementations in reasonably sized integrated circuit components. In the preferred embodiment the large number of multiply operations will be replaced with programmable shifts and adders which values are determined using a lookup table.

One prior art solution to the problem of economical implementation includes calculating subsets of the equalizer filter coefficients in successive symbol intervals. Another prior art approach is to simplify one term of the multiplication (in this case, the error term) by using only the sign of the error term, i.e., +1 or −1. In LMS, this variation is referred to as signed-error LMS (SE-LMS) in which the usual LMS error term is replaced by the sign (+/−1) of the error. SE-LMS is easily implemented since the usual multiplier per equalizer parameter in the LMS update equation is replaced by a simple bit flip (a sign change) to represent multiplication by +1 or −1. Similarly, in CMA a signed-error CMA (SE-CMA), is used to replace the usual, full precision CMA error term with its sign (+1 or −1). Since multiplication by +1 or −1 is just a sign change, multiply calculations are very rapid. A modification of the signed error approach is to use three levels, +1, 0, −1 for the error term in the multiplication. Since the number 0 is neither positive nor negative, multiplication by +1, 0, −1 is still a simple and quick operation. However, approximating a term by its sign sacrifices accuracy and can increase the time required for the adaptive equalizer to converge to a solution. Furthermore, convergence is not guaranteed.

SUMMARY OF THE INVENTION

The present invention is embodied in a blind equalization system in which the error quantizer used to digitize the CMA error function uses different quantization levels in different regions of the CMA error function. The use of different quantization levels in different regions increases quantization precision in area of the CMA error function typically encountered when the equalizer parameters are near convergence.

In another embodiment of the present invention, a quantizer with a step rise having logarithmic scale is used to digitize the CMA error function. In particular, a quantizer with a step rise in which each level of the quantizer step rise is a power of 2 is used to digitize the CMA error function. The use of a power of 2 for the quantizer step rise size simplifies multiplication since multiplication by a power of 2 is a shift operation.

In yet another embodiment of the present invention, a quantizer with a step rise in which each level of the quantizer step rise is the sum of two or more logarithmic scales is used to digitize the CMA error function. In particular, a quantizer with a step rise wherein each level of the quantizer step rise is the sum of two or more numbers each of which is a power of 2, is used to digitize the CMA error function. The use of the sum of two numbers, each of which is a power of 2 for the quantizer step size rise simplifies multiplication since shift and addition operations thus achieve multiplication.

DETAILED DESCRIPTION

Figure 1:
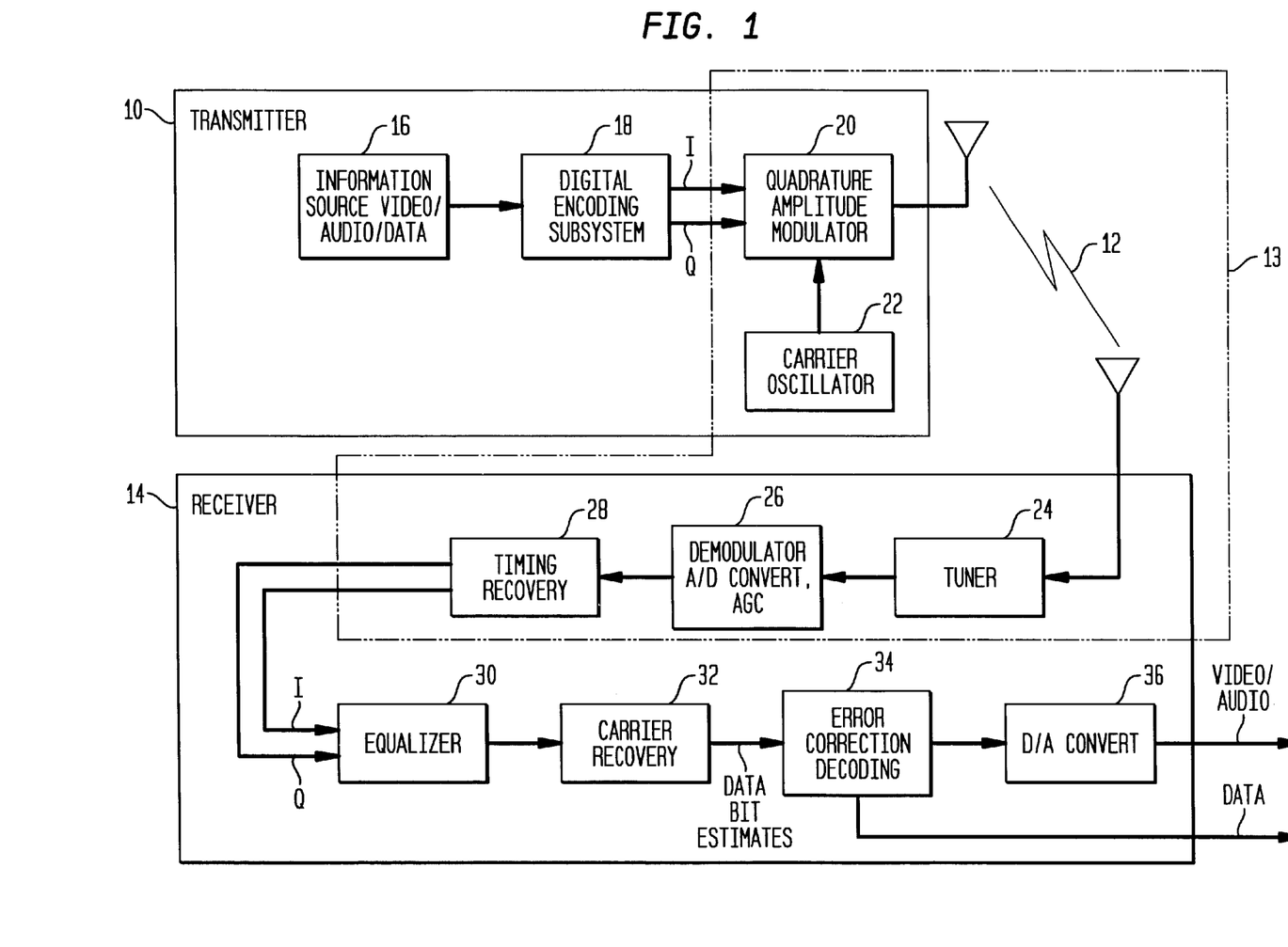
FIG. 1 is a block diagram of a digital communication system employing an equalizer in accordance with the present invention.

A typical communications system has a transmitter station 10 and a receiver station 14, coupled together via a suitable propagation medium 12, as shown in FIG. 1. The transmitter station 10 includes an information source 16 such as video, audio and/or data coupled to a digital encoding subsystem 18. The in-phase component (I) and quadrature phase component (Q) from the QAM digital encoding subsystem 18 are coupled to QAM modulator 20, which modulates the I and Q signal components onto a suitable carrier frequency (provided by carrier oscillator 22) for transmission into the propagation medium 12.

The receiving station 14 includes a tuner 24, demodulator, A/D converter, and AGC (automatic gain control) functions 26, and a timing recovery module 28. The timing recover module 28, reproduces the signal time slicing so that it is aligned with the original I and Q signals in the receiver. The receiving station 14 further includes an adaptive equalizer 30, a carrier recovery function 32, an error correction decoding function 34, and a digital to analog (D/A) converter 36. All of the elements between the original I and Q signals at the output of the digital encoding subsystem 18 in the transmitter, up to the input to the equalizer 30 in the receiver is regarded as the overall communication channel 13. The function of the equalizer 30 in the receiver is to compensate for distortion and noise originating anywhere in the overall communication channel 13.

In operation, the tuner 24 selects an appropriate carrier frequency from the propagation medium 12. The output of tuner 24 is converted to digital samples in an A/D converter and demodulated 26 to the correct frequency range. Also, the AGC 26 feedback loop automatically adjusts the receiver gain level. The timing recovery function 28 pulls the local crystal oscillator which governs the A/D sampling clock into phase lock with the incoming signal. The recovered I and Q signal components from the timing recovery module 28 are input to the equalizer 30.

The output of the equalizer 30 is coupled to a carrier recovery module 32 which pulls the local crystal oscillator into precise carrier frequency and phase lock, and provides data bit estimates to the error correction decoder 34. After error correction decoding 34, the digital data is recovered, and reproductions of the original data, video, and audio are output from the receiver 14. The present invention is embodied in the equalizer 30 portion of the communication system.

PASSBAND EQUALIZATION

Figure 2:
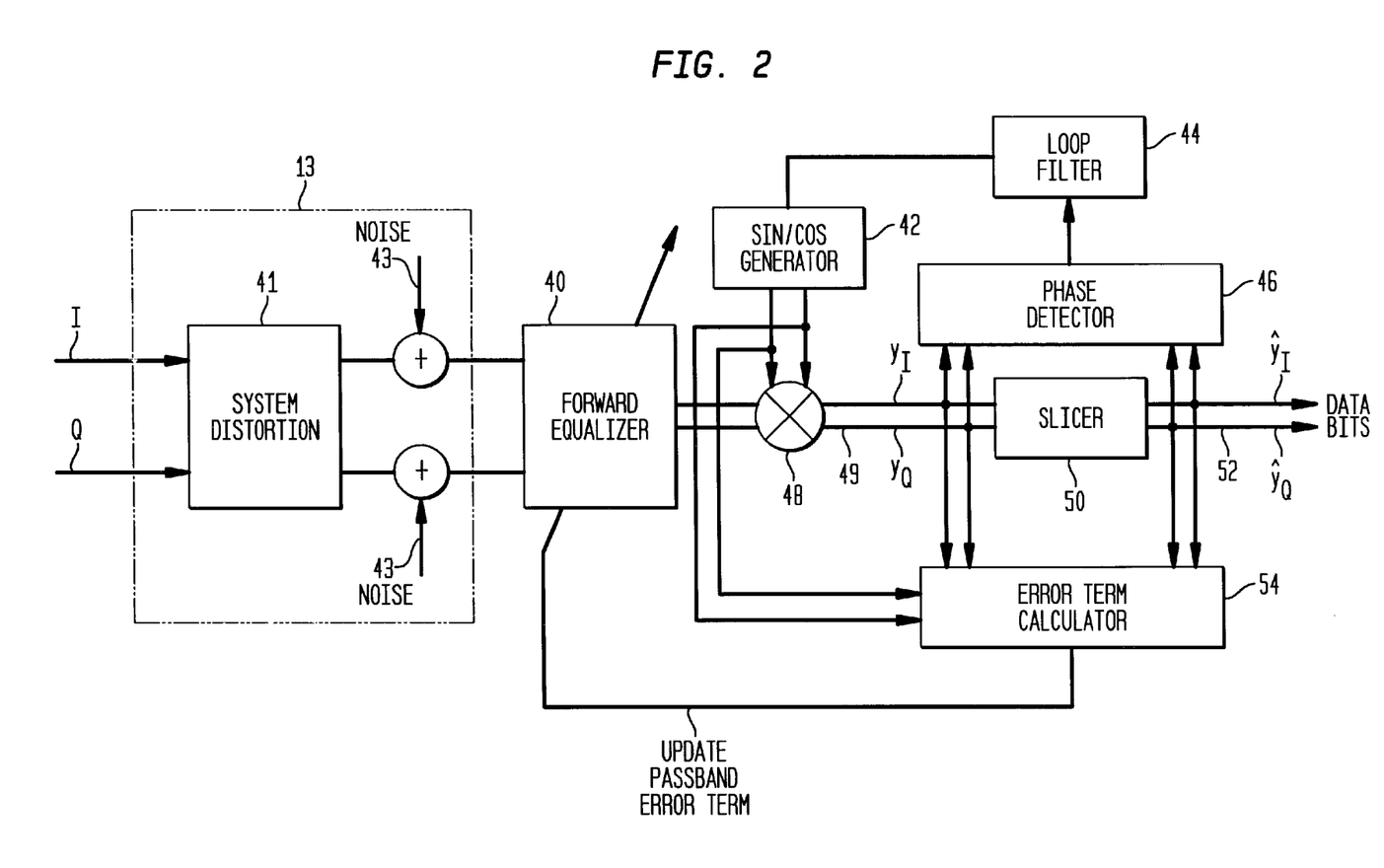
FIG. 2 is a block diagram of a passband equalizer using the CMA and LMS algorithms in accordance with the present invention.

Further details of the equalizer 30 and carrier recovery 32 portions of FIG. 1 are shown in FIG. 2. As indicated, the overall communication channel 13 introduces system distortion 41 and noise 43 into the I and Q signal components from the transmitter. The received I and Q signal components at the receiver are input to the forward equalizer 40, which is typically implemented as a finite impulse response (FIR) filter. The output of the forward equalizer 40 is input to a mixer (multiplier) 48 which translates the processed I and Q signal components to baseband frequency (DC).

The output of the mixer 48 is coupled to a slicer 50, which is set for nominal decision threshold levels that correspond to each symbol in the expected QAM constellation. The input YI and YQ to the slicer 50 are the actual received signal levels which have been filtered 40 and de-rotated 48. After the slicer 50, the output Y^I and Y^Q represent hard decision levels which correspond to the expected signal levels in the QAM constellation.

The phase detector 46, loop filter 44 and sine/cosine generator 42 in combination with multiplier 48 constitute a closed loop for recovering the frequency and phase of the carrier signal. The phase difference of input signals 49 and output signals 52 of slicer 50 is detected in phase detector 46. The detected phase difference, filtered in loop filter 44 controls the frequency and phase of the sine/cosine generator 42 in a direction so as to reduce the detected phase difference between the input signals to the phase detector 46. At steady state, the carrier loop tracks the input carrier frequency and phase.

Both input YI and YQ and output Y^I and Y^Q are input to an error term calculator 54. To the extent that the inputs and outputs of the slicer 50 are not equal, the error term calculator 54 provides an output to update the passband error term in the forward equalizer 40. The error term calculator operates on baseband signals. In order to generate a passband error term, the local carrier loop signal (at the output of sine/cosine generator 42) is input to the error term calculator 54. The present invention relates to the efficient implementation of the error term calculator 54.

BASEBAND EQUALIZATION

Figure 3:
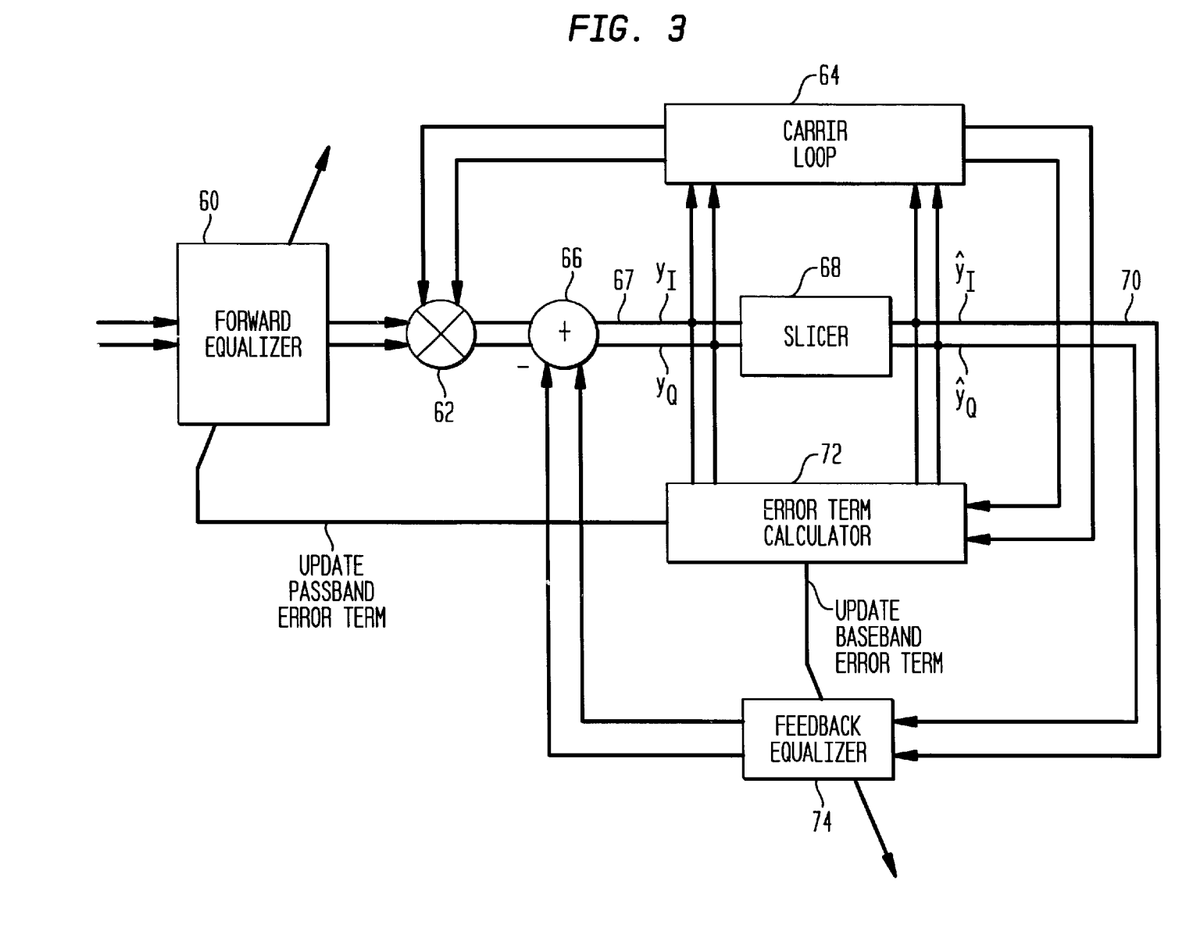
FIG. 3 a passband and baseband equalizer using the CMA and LMS algorithms in accordance with the present invention.

An alternate implementation of the equalizer 30 and carrier recovery 32 of FIG. 1, is shown in FIG. 3. The implementation of FIG. 3 is similar to that of FIG. 2, except that feedback equalization at baseband is included in addition to forward equalization at passband. The added elements in FIG. 3 are an adder 66 and a feedback equalizer 74. The forward equalizer 60 is substantially the same as the forward equalizer 40 in FIG. 2. The slicer 68 in FIG. 3 is substantially similar to the slicer 50 of FIG. 2. Carrier loop 64 in FIG. 3 encompasses substantially the same components as sine/cosine generator 42, loop filter 44 and phase detector 46 of FIG. 2. However, while error calculator 72 in FIG. 3 performs all the functions of error term calculator 54 in FIG. 2, it further provides an output signal to update the baseband error term to the feedback equalizer 74. The feedback equalizer 74 is implemented using an FIR filter imbedded in a feedback loop which makes the overall loop have an infinite impulse response.

Both input YI and YQ and output Y^I and Y^Q are input to the error term calculator 72. To the extent that the inputs and outputs of the slicer 68 are not equal, the error term calculator 72 provides an output to update the passband error term in the forward equalizer 60. As before, in order to generate a passband error term, the local carrier loop signal is input to the error term calculator 72.

Error term calculator 72 provides error term updates for the parameters of both forward equalizer 60 at passband and feedback equalizer 74 at baseband. The present invention relates to the efficient implementation of the error term calculator 72.

As indicated above, the equalizer parameter vector is updated according to a gradient descent strategy in which the average parameter trajectory follows the steepest slope of the specified cost surface (i.e., the parameters move on average in the direction of the derivative of the cost function).

The Constant Modulus cost function is given by $$J_{cm} = E\{(g^2 - |y|^2)^2\}$$

where $g^2$ is a scalar referred to as Godard's (dispersion) constant, y is the baseband equalizer output, and E{.} denotes expectation. The gradient can be found using complex vector calculus and is described by Godard or Treichler, cited above.

The baseband CMA error term $e_{bb}(k)$ is the derivative of $J_{CM}$ with the expectation removed is given by $$e_{bb}(k) = y(k)(g^2 - |y(k)|^2)$$

The CMA error term $e_{bb}(k)$ is applied to all equalizer parameters so that one multiplication per equalizer parameter is required to update the equalizer tapped delay line. For high data rate signaling, the number of multiplications can become computationally prohibitive. Reducing the computational burden is the motivation for the signed algorithms of the prior art described above. A sign operation (multiplication by 0, +1 or −1) is easily implemented as a bit flip in two's complement arithmetic. Therefore, no multiplier is needed, which significantly reduces the required chip die area. The present invention uses a quantized version of the CMA error term, which is implemented at a slightly higher computational cost as compared to the signed algorithm approaches, but still achieves low-precision multiplication using bit shifts and adders.

Figure 4:
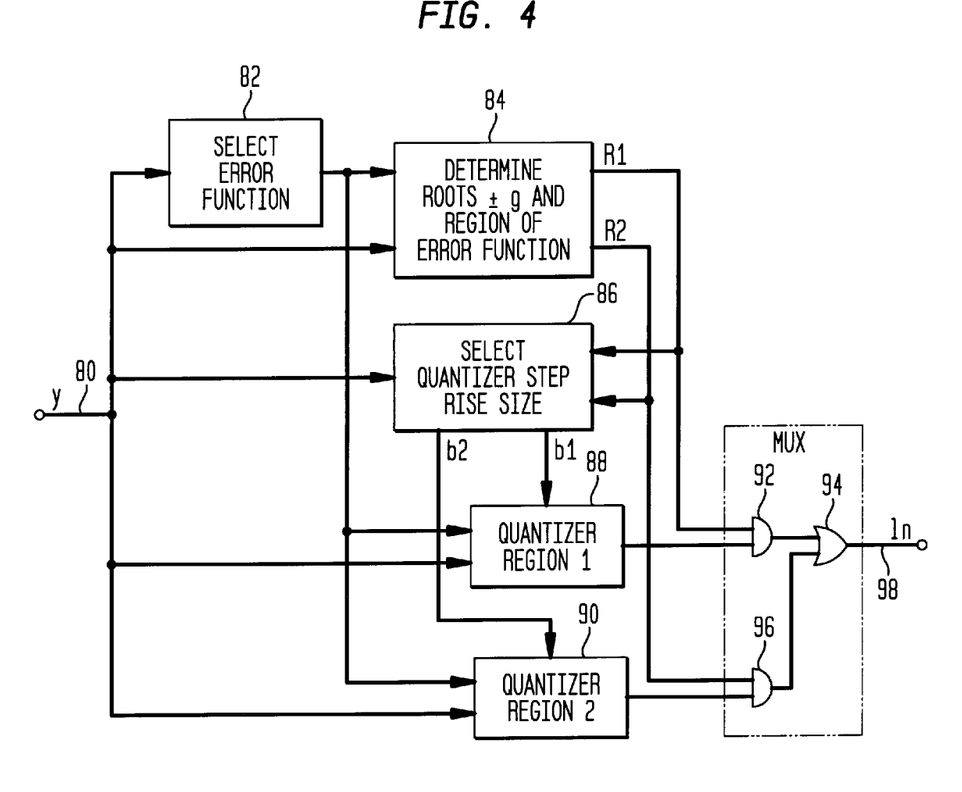
FIG. 4 is a block diagram of a region based error term calculator for use in a CMA equalizer in accordance with the present invention.

In accordance with the present invention, the performance of the CMA algorithm is improved by partitioning the error term into regions and quantizing each region independently. A block diagram of quantizer for use in a CMA error term calculator is shown in FIG. 4. The quantizer of FIG. 4 may be used in the CMA error term calculator 54 in FIG. 2, and error term calculator 72 in FIG. 3. The quantizer of the present invention uses a variety of quantization strategies for efficient implementation of the Constant Modulus Algorithm (CMA). Each of the various strategies is based on partitioning the standard CMA update error term into regions, which are then independently quantized. The invented region based quantization is applied to both one-dimensional signals (such as Vestigial Sideband Modulation (VSB)) and two-dimensional signals (such as Quadrature Amplitude Modulation (QAM)) for both baseband and passband implementations.

Figure 5:
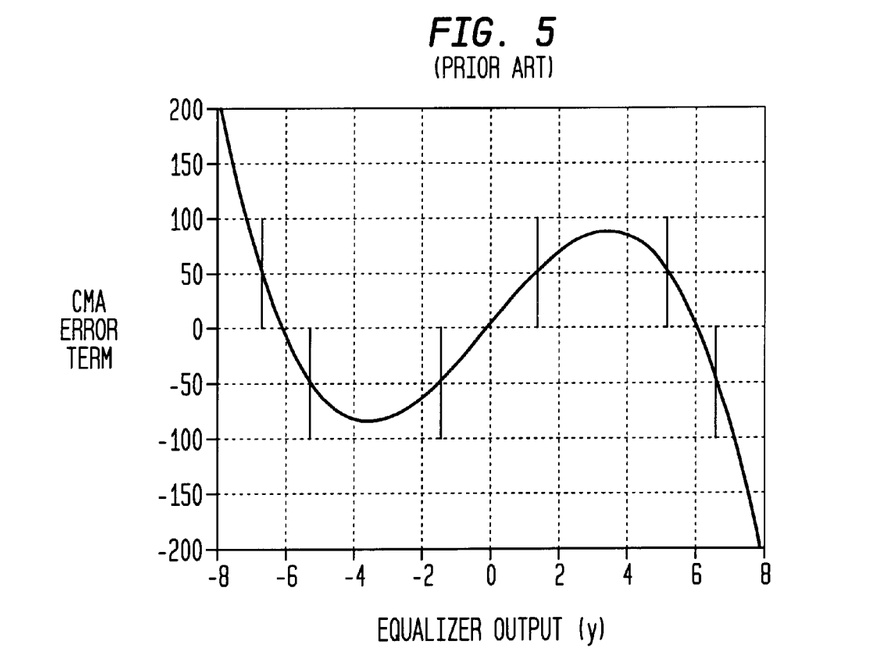
FIG. 5 is a graph of a CMA error function showing the use of prior art 1 bit mid-tread quantization levels.

FIG. 5 shows the usual CMA error function for vestigial sideband modulation (VSB). Since VSB signals modulate information in a single dimension (the amplitude of the RF carrier) the equalizer parameters are therefore constrained to be real numbers. The CMA error term for real, baseband equalizer output y(k), is $e_{bb}(k)$ shown in FIG. 5. The solid line in FIG. 5 is a function of y for 8-VSB signaling with levels $\{+/1, +/-3, +/-5, +/-7\}$. The CMA error term $e_{bb}(k)$ is a cubic function of the equalizer output y which crosses the horizontal axis at three points: the origin (0,0), +g and −g. The dotted lines in FIG. 5 indicate the quantization approach of the prior art, i.e., representation of the error as +1, 0, or −1 using a 1 bit mid-tread quantizer.

Figure 6:
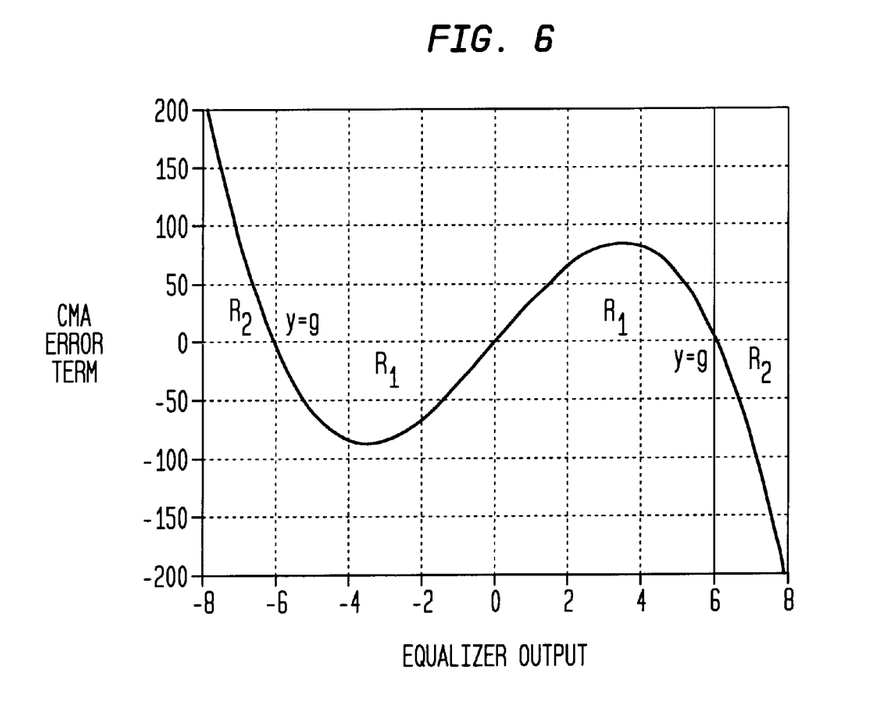
FIG. 6 is a graph of a CMA error function and corresponding regions to be used in accordance with the present invention.

In the present invention, the CMA error term $e_{bb}(k)$ is partitioned into regions along the equalizer-output axis separated by the roots of the cubic equation, where the three roots are y={0,+g,−g}. The roots of the cubic equation are symmetric about the origin, and define two regions (R1 and R2) as shown in FIG. 6. The roots of the CMA error term are Y=g, and Y=−g. Region 1 is defined as the region between −g and +g (i.e., greater than −g and less than +g). Region 2 is defined as everything outside of region 1, i.e., the region less than or equal to −g and greater than +g. In particular, in FIG. 6, equalizer output between +g and −g (approximately +6 and −6) define region R1, while equalizer output greater than +g and less than −g define region R2. Instead of using the same quantization strategy in all regions of the CMA error term, different quantization strategies are used for region R1 and R2.

Figure 7:
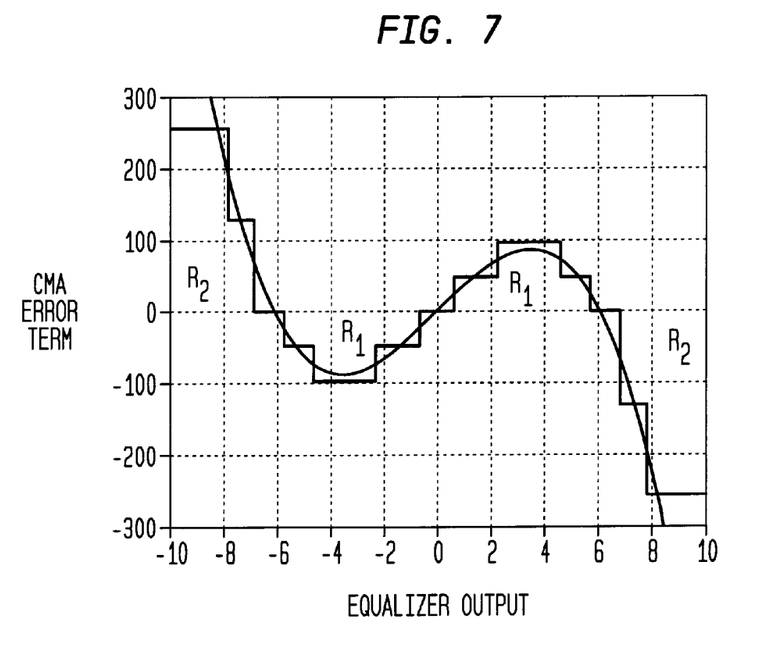
FIG. 7 is a graph of a CMA error function quantized in accordance with the present invention.

For example, in FIG. 7 the CMA error term $e_{bb}(k)$ is quantized in region 1 using quantization steps of 40, and quantized in region 2 using quantiztion steps of 128. The selected quantization step rise sizes (b1=40 in region 1, and b2=128 in region 2) were determined based on a combination of empirical measurement and strategic selection.

Figure 8:
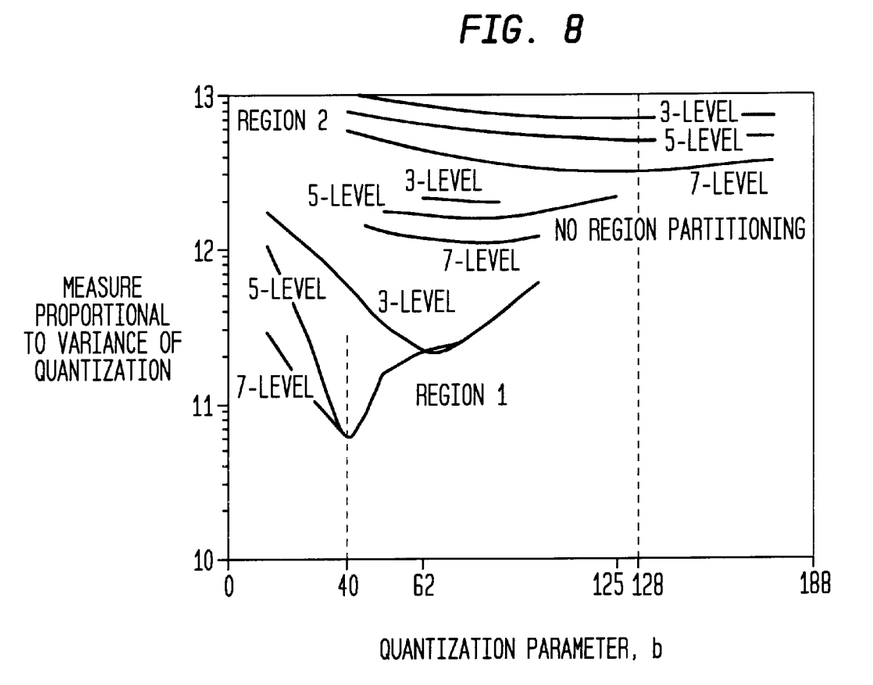
FIG. 8 is a graphical representation of the effectiveness of the present invention over the prior art for various quantizer step rise sizes

In particular, FIG. 8 shows the results of experiments for 8 VSB signaling in which the equalization accuracy for various strategies is measured as a function of the quantizer step rise size b for both region R1 and region R2. The vertical axis is a logarithmic function of equalization accuracy (mean square quantization error).

Complete statistics of the CMA error function over the random variable y are a function of the signaling environment and are generally not known. Instead, proxy statistics are used based on a bit accurate computer model (including front-end demodulation, gain control, timing and carrier recovery, and equalization) where the signaling environment is defined according to Ensemble A proposed by the ATSC (American Television Standards Committee standard). A normalized histogram of the equalizer output using the proxy statistics was used to approximate the mean square quantization error for region 1 and region 2 to derive the curves shown in FIG. 8.

The horizontal axis in FIG. 8 is b, the step rise size of the equalizer. Experimental results for 3, 5 and 7 level mid-tread quantization, for regions R1 and R2 are plotted in FIG. 8. Also, for comparison purposes, the equalization accuracy versus quantization step rise size with no region partitioning, is plotted on the same graph.

As can be seen in FIG. 8, 5 level and 7 level quanitzations exhibit a common minimum in the region around 40. Although 40 is not the very minimum, 40 is selected because it is the sum of 32 and 8, both of which are powers of 2. Since binary numbers are easy to multiply by a power of 2, it is advantageous to select numbers which are powers of 2 or the sum of plural numbers each of which is a power of 2, for the quantizer step rise size in region The present region-based approach sacrifices error in region R2 for precision in region R1, compared to the case with no partitioning of the CMA error term. It has been determined by the inventors that region R2 corresponds more to initial signal acquisition and region R1 corresponds more to asymptotic CMA performance near convergence. Since R2 corresponds to larger CMA error values, the quantization error in R2 is significantly higher than that in R1. The larger quantization error in R2 is tolerated since R2 corresponds more to initial convergence. Although an embodiment with two regions is shown, more than two regions with different quantization levels in each region may be used. The present region-based approach is applicable wherever it is desired to balance error versus precision in multiple regions of the error function.

Therefore, it is advantageous to quantize regions R1 and R2 separately. For implementation purposes, quantization levels are chosen with magnitudes as powers of 2, or 0, b1, 2b1, 4b1 etc. The decision boundaries are chosen midway between quantization levels, or 0, b1/2, 3b1/2, 6b1/2 etc. However, non-uniform quantization levels and decision boundaries may also be used.

For region R2, b2=128 for region R2 is chosen, though the quantization error is not extremely sensitive in this area. However, R1 corresponds more to CMA steady state performance, where the CMA error term assumes smaller values. The latter region is precisely the one where CMA error is in the vicinity of a local minimum and the equalizer is typically transferred to a DD-LMS mode of operation. Therefore, it is desirable to have more accurate quantization in region R1 to provide successful, reliable algorithm transfer. The region-based quantization system provides exactly the desired behavior, trading off performance in R2 for that in R1. FIG. 8 also suggests that little improvement is seen in R1 by going from a 5 to 7 level quantizer, though 5 levels significantly out performs a 3-level quantizer. Therefore, a 5-level quantizer with B1=40 is chosen.

Figure 9:
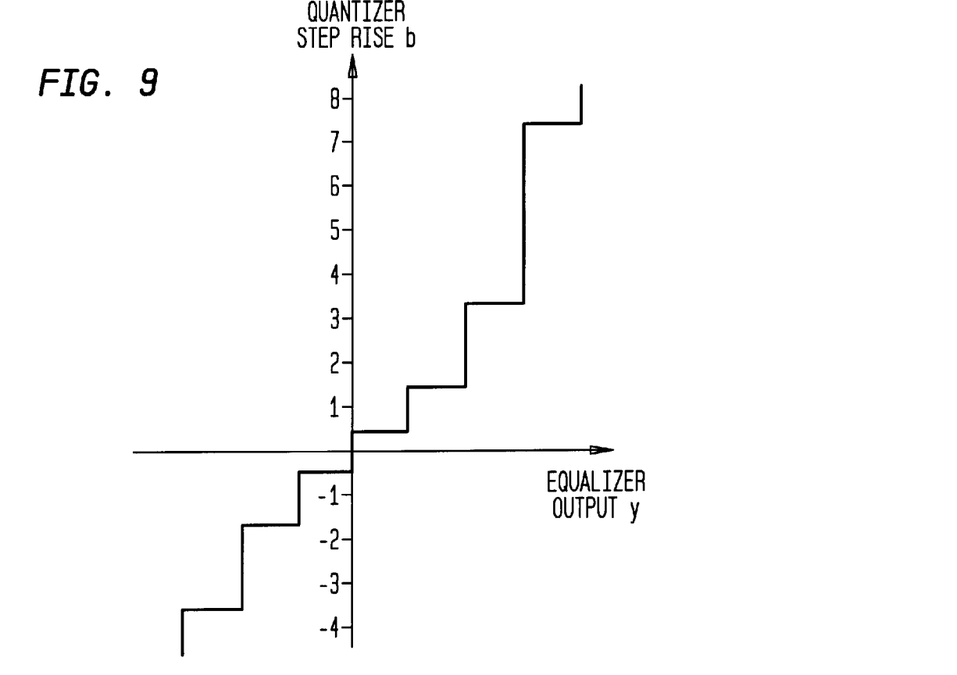
FIG. 9 is a graphical representation of a mid-rise quantization function for use in conjunction with the present invention.
Figure 10:
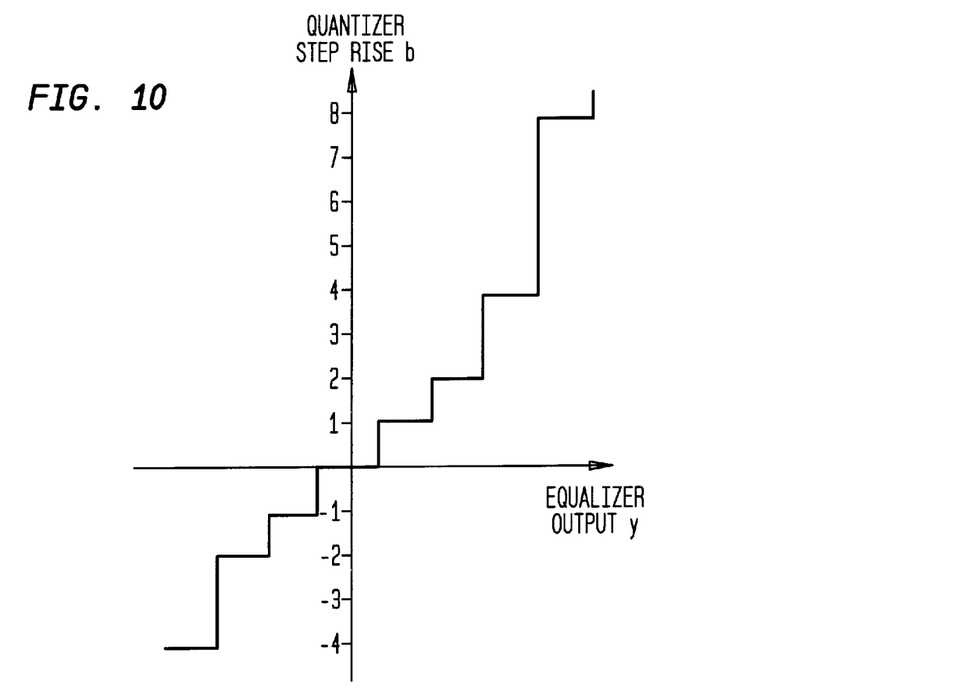
FIG. 10 is a graphical representation of a mid-tread quantization function for use in conjunction with the present invention

FIG. 9 is a graphical representation of a logarithmic quantizer with a mid-rise quantization function for use in conjunction with the present invention. FIG. 10 is a graphical representation of a logarithmic quantizer with a mid-tread quantization function for use in conjunction with the present invention.

A block diagram of an error quantizer in accordance with the present invention is shown in FIG. 4. The input y, at input terminal 80 is the baseband equalizer output, and the output $e_n$ at terminal 98 is the quantized value of the CMA error term, $e_{bb}(k)$. The error quantizer includes an error function selector 82 and a module 84 for determining the roots of the selected error function. The error quantizer also includes a module 86 for selecting the quantizer step rise size, two quantizers 88, 90 and a multiplexer consisting of two AND gates 92, 96 and an OR gate 94. The quantizers 88 and 90 are either the mid-rise or mid-tread logarithmic quantizers shown in FIGS. 9 or 10 respectively.

A 1-bit mid-rise quantizer (FIG. 9) quantizes all positive values of positive CMA error to a +1 value and all negative values of negative CMA error to a −1. The zero value is arbitrarily set to +1 or −1. Alternatively, a 1-bit mid-tread quantizer (FIG. 10) contains the 0 value as a valid output and therefore maps small positive or negative values of CMA error to zero. A mid-tread quantizer can have significantly better performance over a mid-rise quantizer, although either a mid-tread or mid-rise quantizers may be used.

In operation for FIG. 4, the baseband equalizer output y, is applied to input terminal 80. For each digital sample, a CMA error function is selected (CMA error functions are shown as curves in FIGS. 5, 6 and 7). The roots, +g and −g, of the selected error function (curve) are determined in module 84 by any suitable method such as table look-up or direct solution of the appropriate cubic equation. In addition, module 84 determines the boundaries of region 1 and region 2. Outputs R1 and R2 from module 84 indicate whether the input sample Y is in either region 1 or region 2, respectively.

Thereafter, depending on the region R1 or R2 of the error function determined by the current input sample y, (both of which are input to module 86), a quantizer step rise size, b1 for region 1 and b2 for region 2 is selected in module 86. Output b1 from module 86 sets the quantizer step rise size in the quantizer 88 for region 1. Output b2 from module 86 sets the quantizer step rise size in the quantizer 90 for region 2.

Output R1 from module 86 enables AND gate 92 to select the output of quantizer 88 corresponding to region 1 to go to OR gate 94 and output terminal 98. Output R2 from module 86 enables AND gate 96 to select the output of quantizer 90 corresponding to region 2 to go to OR gate 94 and output terminal 98. Since outputs R1 and R2 are mutually exclusive, the output of either the quantizer 88 or region 1 or the quantizer 90 for region 2 is selected for output to terminal 98.

The output $e_n$ at terminal 98 is the quantized value of the CMA error term, $e_{bb}(k)$, which is used in further computations to the update the parameters of the equalization filer. Thus the error quantizer of FIG. 4 digitizes the CMA error function 82 using different quantization step rise sizes b1, b2 in different regions R1, R2 of the CMA error function.

Passband Error Processing

Figure 11:
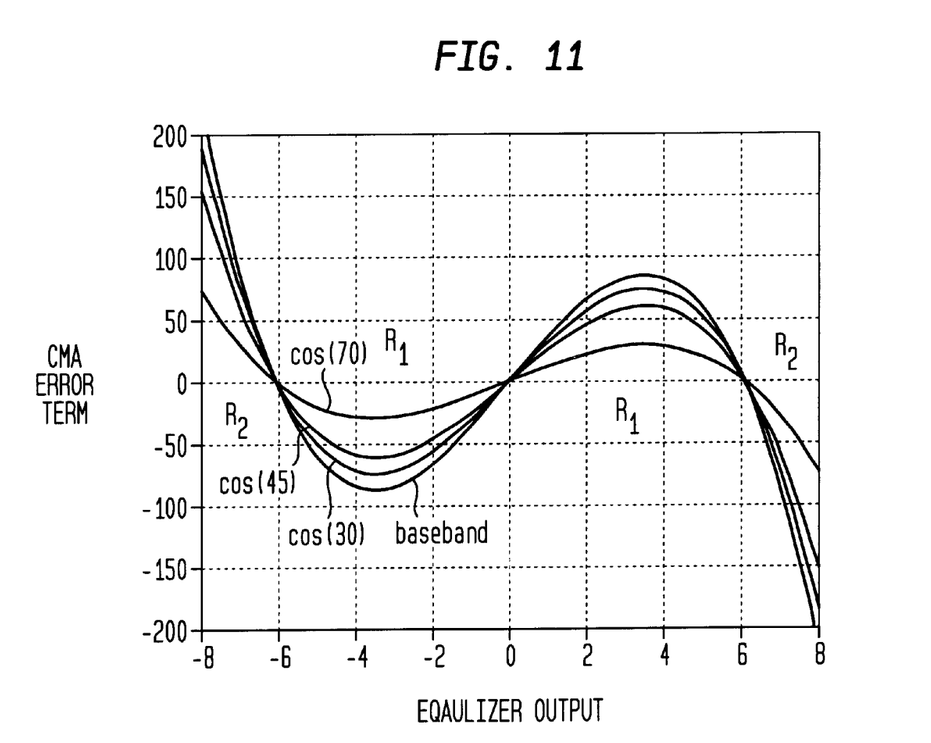
FIG. 11 is a graph of the in-phase component of a passband CMA error term for 8-VSB signaling used in conjunction with the present invention.

In the above embodiment, only baseband CMA error processing is considered. When the equalizer parameters operate in the passband (away from DC) the passband CMA error term is a rotated version of the baseband CMA error term. For VSB, baseband samples of Y are real-valued, since information is encoded into only the amplitude, not phase, in VSB signaling. Hence, the I and Q components of the passband error term are scaled (in magnitude) versions of the baseband error term. However, the roots of the cubic, and boundaries of regions R1 and R2 for the passband error term remain unchanged from the baseband error term. FIG. 11 shows the I component of the passband CMA error term for 8-VSB signaling and rotation angles of 0 (baseband), 30, 45 and 70 degrees.

Since the boundaries of regions R1 and R2 are the same for all rotation angles, a single comparison of the baseband equalizer output, y, to a constant (g in the equations above) is used to determine the appropriate region (R1 or R2) for both baseband and passband error terms.

For passband processing, the quantized baseband CMA error term is rotated in order to generate a quantized passband CMA error term One way to achieve the required rotation is to quantize the sine/cosine terms before multiplication with the baseband error term. Another method for rotating the quantized baseband CMA error term is to first multiply with full precision sine/cosine terms provided by the carrier synchronization circuitry and then quantize the product to the desired bit-width.

In the case of QAM signaling, where information is encoded into the RF carrier in both amplitude and phase, the baseband equalizer output, y, is a complex variable. The region boundaries for R1 and R2 are then determined from a family of CMA error function curves rather than the single baseband error function curve as is the case of VSB signaling. In the general case, including QAM signaling, an error function curve is first selected from a family of error function curves. Then the selected curve is independently quantized using the approaches described above for VSB signaling.

In the CMA error function for QAM signaling, y is represented by its real and imaginary parts, $y=I+jQ$. The CMA error term Ecma is, $$\text{Ecma}=(I+jQ)*(g^2-I2-Q2)$$

Figure 12:
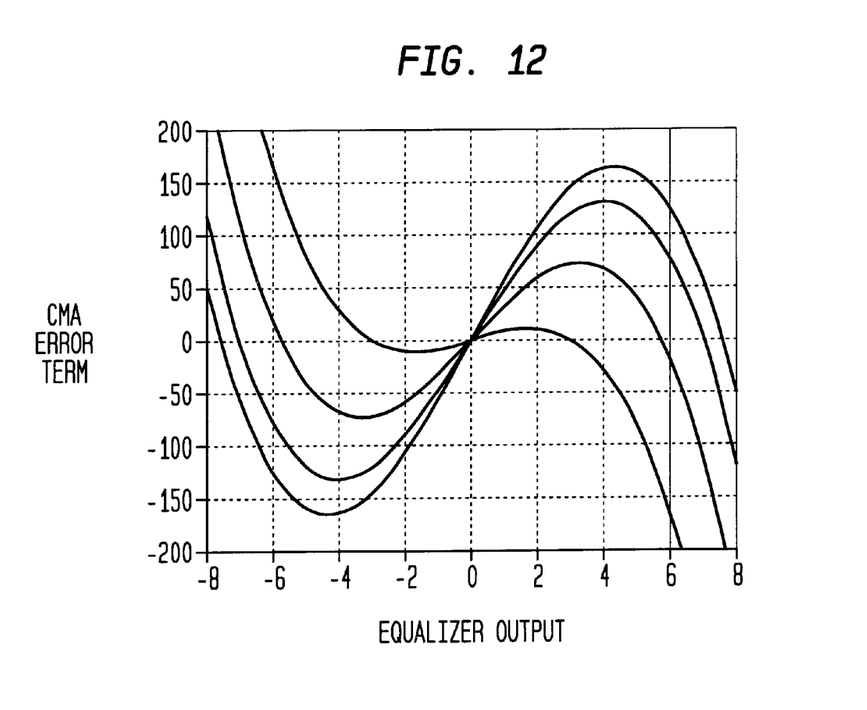
FIG. 12 is a graph of the in-phase component of a CMA error function for quadrature amplitude modulation (QAM) signaling used in conjunction with the present invention.

After separating into in-phase and quadrature components, the roots of the in-phase and quadrature components are given by $$I=\{0, -\text{sqrt}(g2-Q2), \text{sqrt}(g2-Q2)\}$$

$$\text{and } Q=\{0, -\text{sqrt}(g2-I2), \text{sqrt}(g2-I2)\}$$

respectively. The root locations of each component are a function of the Godard radius (as in VSB) and the orthogonal sample component. As a result, the region boundaries which separate R1 and R2 move depending on the current sample. FIG. 12 illustrates the in-phase component of the CMA error function when the quadrature sample is evaluated at symbol values for 64-QAM signaling.

Figure 13:
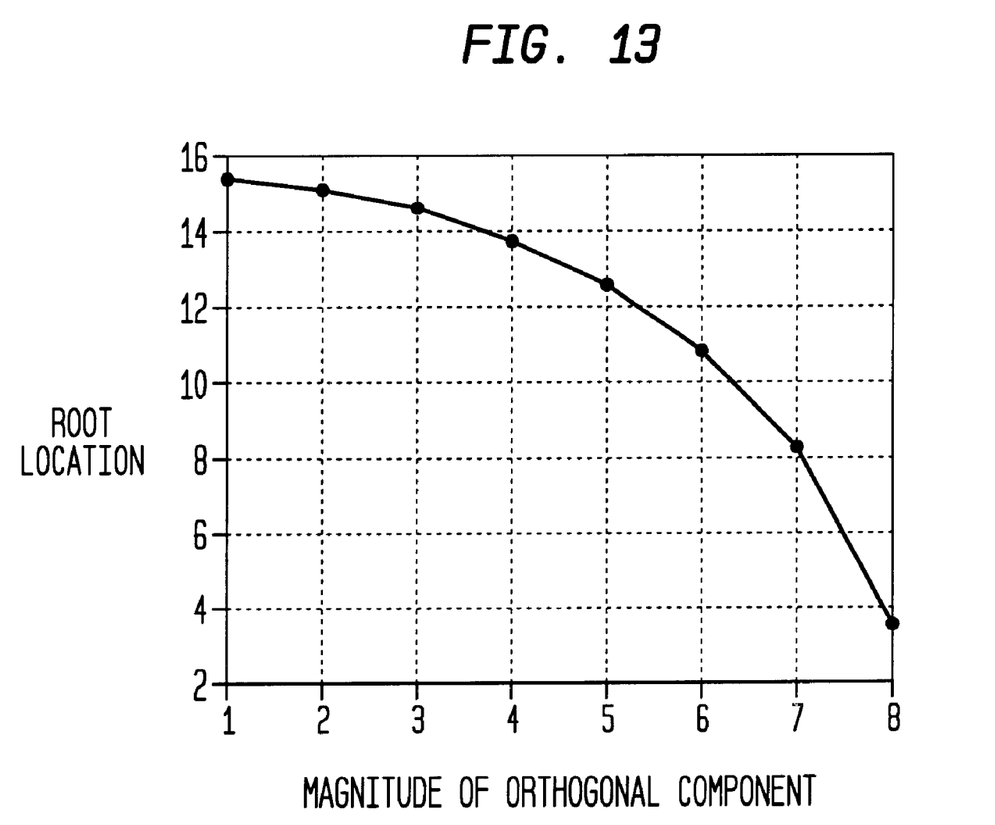
FIG. 13 is a graph of the root locations of the in-phase component of a CMA error term for 256 QAM signaling used in conjunction with the present invention.

In FIG. 12 the root locations (zero crossings) wander as the quadrature samples assume different symbol values. In particular, for higher order constellations, the root locations display significant movement. FIG. 13 shows the values of the root locations (sqrt(g2−Q2)) as Q assumes symbol values for 256-QAM signaling. Root locations are displaced by about a factor of 3. Thus in the general case, movement of the region movements boundaries is considered.

In the general case for QAM signaling, the orthogonal sample is first "sliced" from a standard, nearest-element decision device. The decision device takes the orthogonal component as its input and outputs the projection of the nearest symbol value from the grid of constellation points. The symbol estimate is used to select one of the curves in FIG. 12. Once a curve is selected, quantization is analogous to that for VSB signaling. The following steps apply to the quantization procedure for the in-phase component of the CMA error term. The quadrature phase component is analogous.

Step 1: Decide Which Curve to Select

For input Q to the decision device, Q^ is the output of the slicer. The sample Q^ is the nearest symbol projection to Q.

Select the curve in FIG. 12 corresponding to orthogonal sample value Q^.

Step 2: Choose R1 or R2 for the selected curve

Once one of the curves is selected, the magnitude of the in-phase sample, I, is compared to the root location (sqrt (g2−Q^2)) of the specified curve in order to select region R1 or region R2.

Step 3: Quantize the Magnitude of the Error Term

The in-phase sample, I, is used to select a quantization level from {0, bi, 2bi, . . . 2nbi} by comparing I to the uniform decision boundaries 0, bi/2, 3bi/2, . . .

Step 4: Determine the Sign of the Quantized Error

The sign of the error is determined from the sign of I, and the region selected.

Steps 2–4 are identical to VSB error quantization with Q and Q^ equal to zero and y=I. In the case of passband processing, the baseband CMA error term is complex for QAM signaling. The rotation of the CMA error term involves the sum of two products for each component of the passband error term.

The values assumed by the update error term assume a finite number of levels, and can be determined using look-up table(s), thus reducing multiplier count. In addition, the use of look-up tables reduces the delay in processing. Another implementation for the application of the quantized error term is to use low bit-width multipliers. However, in the preferred embodiment, b1 and b2 are selected as powers of 2 and sums of powers of 2. In particular, since b1 is equal to 40, which is 32 plus 8 ($2^5+2^3$) and b2 is equal to 128, which is $2^7$ shifts and adders are used in place of multipliers.

What is claimed is:

1. In a digital communications receiver including an equalization filter having a plurality of adjustable parameters, and an error term calculator for updating said plurality of adjustable parameters, said error term calculator responsive to a received digital signal and the error in said received digital signal, said error being proportional to an error function, a quantization method comprising:
    determining first and second regions of said error function;
    quantizing said first region of said error function using a first step rise size; and
    quantizing said second region of said error function using a second step rise size.

2. A method in accordance with claim 1, further including:
    selecting said error function responsive to said received digital signal; and
    determining the roots of said error function, wherein said roots define the boundaries of said first and second regions of said error function.

3. A method in accordance with claim 1, wherein said first region of said error function using said first step rise size is quantized using a logarithmic scale.

4. A method in accordance with claim 3, wherein said second region of said error function using said second step rise size is quantized using a logarithmic scale.

5. A method in accordance with claim 1, wherein said first step rise size is selected to be a power of 2.

6. A method in accordance with claim 5, wherein said second step rise size is selected to be a power of 2.

7. A method in accordance with claim 1, wherein said first step rise size is selected to be the sum of at least two numbers, each of which numbers is a power of 2.

8. A method in accordance with claim 7, wherein said second step rise size is selected to be the sum of at least two numbers, each of which numbers is a power of 2.

9. A method in accordance with claim 1, wherein said first step rise size is equal to 40.

10. A method in accordance with claim 1, wherein said second step rise size is equal to 128.

11. A method in accordance with claim 1, wherein the boundary between said first and second regions of said error function is the square root of Godard's radius.

12. In a digital communications receiver including an equalization filter having a plurality of adjustable parameters, and an error term calculator for updating said plurality of adjustable parameters, said error term calculator responsive to a received digital signal and the error in said received digital signal, said error being proportional to an error function, a quantization apparatus comprising:
    means for determining first and second regions of said error function;
    means for quantizing said first region of said error function using a first step rise size; and
    means for quantizing said second region of said error function using a second step rise size.

13. An apparatus in accordance with claim 12, further including:
    means for selecting said error function responsive to said received digital signal; and
    means for determining the roots of said error function, wherein said roots define the boundaries of said first and second regions of said error function.

14. An apparatus in accordance with claim 12, wherein said first region of said error function using said first step rise size is quantized using a logarithmic scale.

15. An apparatus in accordance with claim 14, wherein said second region of said error function using said second step rise size is quantized using a logarithmic scale.

16. An apparatus in accordance with claim 12, wherein said first step rise size is selected to be a power of 2.

17. An apparatus in accordance with claim 16, wherein said second step rise size is selected to be a power of 2.

18. An apparatus in accordance with claim 12, wherein said first step rise size is selected to be the sum of at least two numbers, each of which numbers is a power of 2.

19. An apparatus in accordance with claim 18, wherein said second step rise size is selected to be the sum of at least two numbers, each of which numbers is a power of 2.

20. An apparatus in accordance with claim 12, wherein said first step rise size is equal to 40.

21. An apparatus in accordance with claim 12, wherein said second
    step rise size is equal to 128.

22. An apparatus in accordance with claim 13, wherein the boundary between said first and second regions of said error function is the square root of Godard's radius.

23. In a digital communications receiver including an equalization filter having a plurality of adjustable parameters, and an error term calculator for updating said plurality of adjustable parameters, said error term calculator responsive to a received digital signal and the error in said received digital signal, said error being proportional to an error function, a quantization method comprising:
    quantizing said error function using a step rise size according to a logarithmic scale to provide a quantized error function; and
    updating said plurality of adjustable parameters using said quantized error function.

24. A method in accordance with claim 23, wherein said step rise size is selected to be a power of 2.

25. A method in accordance with claim 23, wherein said step rise size is selected to be the sum of at least two numbers, each of which numbers is a power of 2.

26. In a digital communications receiver including an equalization filter having a plurality of adjustable parameters, and an error term calculator for updating said plurality of adjustable parameters, said error term calculator responsive to a received digital signal and the error in said received digital signal, said error being proportional to an error function, a quantization apparatus comprising:

means for quantizing said error function using a step rise size according to a logarithmic scale to provide a quantized error function; and means for updating said plurality of adjustable parameters using said quantized error function.

27. An apparatus in accordance with claim 26, wherein said step rise size is selected to be a power of 2.

28. An apparatus in accordance with claim 26, wherein said step rise size is selected to be the sum of at least two numbers, each of which numbers is a power of 2.

29. An equalizer for a digital communications receiver for receiving digital symbols, said equalizer comprising:

an equalization filter having a plurality of adjustable parameters, and an output terminal providing said received digital symbols;

a slicer having a respective input and output, the input of said slicer being coupled to the output of said equalization filter, said slicer being set for the nominal decision threshold levels corresponding to each of said digital symbols;

an error term calculator for updating said plurality of adjustable parameters of said equalization filter, said error term calculator responsive to said received digital symbols and to the output of said slicer to determine an error function;

said error term calculator further responsive to said received digital symbols to determine first and second regions of said error function; and a quantizer having a respective input and output, said quantizer further having a first step rise size to digitize said error function in said first region and a second step rise size to digitize said error function in said second region, wherein the output of said quantizer is used in said error term calculator to update said plurality of adjustable parameters of said equalization filter.

30. An equalization filter in accordance with claim 29, wherein at least one of said first and second regions of said error function are respectively quantized using a logarithmic scale.

31. A method in accordance with claim 29, wherein at least one of said first and second step rise size is selected to be a power of 2.

32. A method in accordance with claim 29, wherein at least one of said first and second step rise size is selected to be the sum of at least two numbers, each of which numbers is a power of 2.

33. An equalizer for a digital communications receiver for receiving digital symbols, said equalizer comprising:

an equalization filter having a plurality of adjustable parameters, and an output terminal providing said received digital symbols;

a slicer having a respective input and output, the input of said slicer being coupled to the output of said equalization filter, said slicer being set for the nominal decision threshold levels corresponding to each of said digital symbols;

an error term calculator for updating said plurality of adjustable parameters of said equalization filter, said error term calculator responsive to said received digital symbols and to the output of said slicer to determine an error function; and a quantizer having a respective input and output, said quantizer further having a step rise size to digitize said error function, said step rise size being a logarithmic scale, wherein the output of said quantizer is used in said error term calculator to update said plurality of adjustable parameters of said equalization filter.

34. A quantizer in accordance with claim 33, wherein said step rise size is selected to be a power of 2.

35. A method in accordance with claim 34, wherein said step rise size is selected to be the sum of at least two numbers, each of which numbers is a power of 2.

36. A method in accordance with claim 5, wherein said error term calculator for updating said plurality of adjustable parameters includes at least one multiply operation, said method further comprising performing said multiply operation by only one shift operation.

37. A method in accordance with claim 24 wherein said error term calculator for updating said plurality of adjustable parameters includes at least one multiply operation, said method further comprising performing said multiply operation by only one shift operation.

38. A method in accordance with claim 7, wherein said error term calculator for updating said plurality of adjustable parameters includes at least one multiply operation, said method further comprising performing said multiply operation by only two shift operations and one add operation.

39. A method in accordance with claim 25, wherein said error term calculator for updating said plurality of adjustable parameters includes at least one multiply operation, said method further comprising performing said multiply operation by only two shift operations and one add operation.

40. An apparatus in accordance with claim 16, wherein said error term calculator for updating said plurality of adjustable parameters includes at least one multiply operation, said apparatus further comprising means for performing said multiply operation by only one shift operation.

41. An apparatus in accordance with claim 27, wherein said error term calculator for updating said plurality of adjustable parameters includes at least one multiply operation, said apparatus further comprising means for performing said multiply operation by only one shift operation.

42. An apparatus in accordance with claim 18, wherein said error term calculator for updating said plurality of adjustable parameters includes at least one multiply operation, said apparatus further comprising means for performing said multiply operation by only two shift operations and one add operation.

43. An apparatus in accordance with claim 28, wherein said error term calculator for updating said plurality of adjustable parameters includes at least one multiply operation, said apparatus further comprising means for performing said multiply operation by only two shift operations and one add operation.

* * * * *